(12) United States Patent
Merriman

(10) Patent No.: X8767
(45) Date of Patent: Apr. 14, 1835

(54) WINDOW FASTENING

(76) Inventor: Marcus Jr. Merriman

Marcus Merriman. Jr. New Haven

Letters Patent.

The Schedule referred to in these Letters Patent and making part of the same, containing a description in the words of the said Marcus Merriman. Jr himself of his improvement in the bolt & spring for holding up or fastening down window-sashes and for securing window blinds which he calls "Merriman's Window Spring & Bolt."

To all to whom these presents shall come.

Be it known that I Marcus Merriman Jr of New Haven in New Haven County in the State of Connecticut a Citizen of the United States, have invented a new and useful improvement in the bolt and spring for holding up or fastening down window sashes. and for securing window blinds which I call "Merriman's window Spring & Bolt." The following is a full and exact description of my invention & of the construction & operation thereof & of the principle of the invention and of the manner of using it, & of the several modes in which I have contemplated the application of that principle or character, with the alteration in the parts necessary to adapt it to the different modes of using it.

The principle of my invention and improvement is to produce by suitable machinery, a self moving catch. strong, cheap and durable, to effect the contemplated fastening, without external aid. In view of this object, my window spring & bolt consists of the following parts. A front plate, a bolt with a thumb-piece, a spiral spring & a collar. These several parts may be made of Brass, of iron, or of any other suitable metal. When applied & used for sash fastenings, the front plate may be in shape, circular. square or oblong oblong, from one to two inches broad & in thickness from one tenth to one fifth of an inch, according to the size and weight of the sash having a square mortice in the centre of the size of the bolt head hereafter described & thro which it is to play. The bolt is of one piece & consists of a round shank at one end one fourth of an inch in diameter, about an inch long, then forming with a shoulder a square head three fourths of an inch long & from half to three fourths of an inch square & terminating in a thumb piece about three fourths of an inch long projecting from the front side of the square head of the bolt in a shape adapted to its use. The spiral spring consists of a coil of suitable wire to surround the shank of the bolt, so coiled that it may be depressed to half an inch in length, or open by its elastic spring to the length of one inch or more admitting the shank to play freely within The collar is a round plate of metal about half an inch in diameter, with a hole in the centre one fourth of an inch in diameter, to receive freely the shank of the bolt. The parts thus formed are put together and inserted for use as follows. — A horizontal mortice is made in the window frame opposite to the sash to be secured, of the size, shape, thickness & depth of the front plate. If the plate is circular the mortice may be made by a centre bit, otherwise by proper tools. from the centre of this mortice or directly behind the mortice in the front plate, for the head of the bolt a hole is bored into the window frame by a centre bit about half an inch in diameter, or of a size to receive freely the square head of the bolt when depressed and of the debth of about one inch, or sufficiently deep to receive the head of the bolt, & the spring below it when depressed, at the bottom of this hole or chamber, insert the collar which is to be of a size to fit the hole: but before inserting the collar, a hole is bored from the centre of the the hole last described, with a less bit about three fourths
of an inch deep, for the shank of the bolt to play in when
depressed below the collar, resting on the shoulder
made by the different size of the holes.
I place the spiral spring around the shank of the bolt
and between the square head of the bolt & the collar resting
on the shoulder above described. The parts being thus
connected & inserted & made to play exact & freely; the
front plate is secured in place by screws imbedded
exactly flush with the window frame embracing the head
of the bolt in the mortice made to receive and fit it.
The spiral spring forces the head of the bolt to project about
half an inch beyond the plate, & is prevented from projecting
it further, by a pin or other stopper on the bolt behind the
plate. Notches to receive the head of the bolt are cut in the
sash to be secured and the bolt thus forced by the spring
enters those notches & thereby holds the sash in any
desired place when raised up or closed. The head
of the bolt should be a little rounded at the edges to prevent
friction, or friction rollers may be inserted.—
The hole bored in the frame for the bolt should be a little
larger than the head & being covered by the plate may be
left round; but care must be used to give it the exact depth,
necessary to depress the head of the bolt to the face of the
plate & without destroying the force of the spring. The thumb
piece projects in front of the sash through an aperture
made in the casing or moulding in front of the sash
by means of this thumb piece the bolt is to be depressed
when the sash is moved.— The mode of insertion above
described is the most simple & the cheapest & is equally
strong when done, but if preferred all the parts may be
connected before insertion by a surrounding plate or by
permanent studs between the front plate & collar so
placed placed & firmly rivited as to keep them apart at the proper distance without depending on the accuracy of the chamber in the frame; This would add to the expense & is not necessary when the chamber is accurately made as directed. The bolt & spring herein described are calculated for windows of ordinary size. for heavier or lighter windows, the several parts may be proportionably enlarged or lessened. They are also equally applicable to the upper & lower sash. When this bolt & spring is applied and used for securing blinds or outside window-shutters, or other small doors, the several parts are connected before insertion in the manner and form following, the front plate is of a length and width just to cover the whole mortice for the bolt as hereafter described & bending under to extend across the bottom bar of the blind with a bevel suited to its shape. In the face of the plate on the bottom of the blind or shutter is a mortice to receive & fit the head of the bolt. The shank of the bolt is round about one sixth of an inch in diameter & one inch long, terminating in a shoulder & head about one fourth of an inch in diameter & half an inch long rounded on the end. The head may be square or round. The collar with a central hole to fit the shank of the bolt is soldered to the plate or otherwise forms a part of it so placed that the centre of the hole in the collar will be directly over the centre of the mortice for the head of the bolt, & about one inch above it. The spiral spring as described above is then placed around the shank between the collar and the head of the bolt, this will project the bolt about three eighths of an inch, that the plate on the bottom & is prevented from projecting it farther by a pin or ledge, or by the lever lever of the thumb piece which may be calculated to
check it. The thumb piece invented, applied & used
by me to raise the bolt when applied to blinds &c. is
an elbow lever, passing through a long mortice in the
plate in front of the bolt, the arm standing nearly at
right angles, playing on a pivot at or near the angle,
supported by lips on the back side of the plate; the
shortest arm of the lever passing horizontally, thro'
a bevelling mortice in the bolt & under a steel pin
passing thro' the bolt across the mortice. The other arm of
the lever rises nearly perpendicular half or three fourths
of an inch in the mortice of the plate & terminates in
a thumb piece in front of it. — The bolt & spring thus
prepared are inserted so that the bolt shall stand
perpendicular, in a mortice about three eighths of
an inch square & one & a quarter long, made in the
bottom cross bar, near the opening edge of each shutter
or blind & on the inside when closed. The part of the
plate under the bottom should be imbedded its thickness
& the plate should be secured there & in front by screws.
A piece of sheet iron or other metal forming an inclined
plane, is imbedded or fixed upon the window stool or
frame, to receive & raise the head of the bolt while the blind
closes & when in place the bolt is projected into a hole there
made to receive it; In like manner when the blind is thrown
open a fastening or stay projecting from the side of the house
& forming an inclined plane under the bolt will raise it &
permit the blind to swing to its place, and the bolt then
falling into a hole or ledge made to receive it will secure
the blind open. By gentle pressure on the thumb piece the
bolt is raised & the blind or shutter is released from
either fastening. — Models & Drawings accompany
this specification & may assist in explaining it.

The

United States Patent

Patent No.: X8767

The advantages resulting from these improvements in both modes of application, are, that the bolt being firmly shouldered on all sides by the plate at one end & by the collar at the other, is stronger than any other now in use, & being governed by a spiral spring, is easily managed & not liable to disorder. It is simple & compact in form, may be made cheap, is easily inser-ted & will be more durable than any now in use - and when used for blind fastening is more secure than those in common use, as these cannot be opened from without. I do not claim as my invention the spiral spring or its application to window fastenings, both have been long known & used. - But I do claim as my invention and improvement the more perfect & effectual applications thereof particularly in the form of the Bolt & plate & collar & the simple combination of the several parts, by which the spring & Bolt collars above described is made & inserted as above specified & by which new & beneficial results are produced - I also claim as my invention and improvement the elbow lever thumb piece & its application as above specified and for these improvements combined and separate I solicit Letters Patent according to law - New Haven March 16th 1835

Witnesses

Roger S Baldwin }
Dennis Kimberly }

Marcus Merriman Jr

Exd.
W.J.C.